M. L. BEISTLE.
ARTIFICIAL WREATH.
APPLICATION FILED MAY 7, 1913.

1,093,243.

Patented Apr. 14, 1914.

2 SHEETS—SHEET 1.

Inventor
M. L. Beistle.

Witnesses

By
Attorneys.

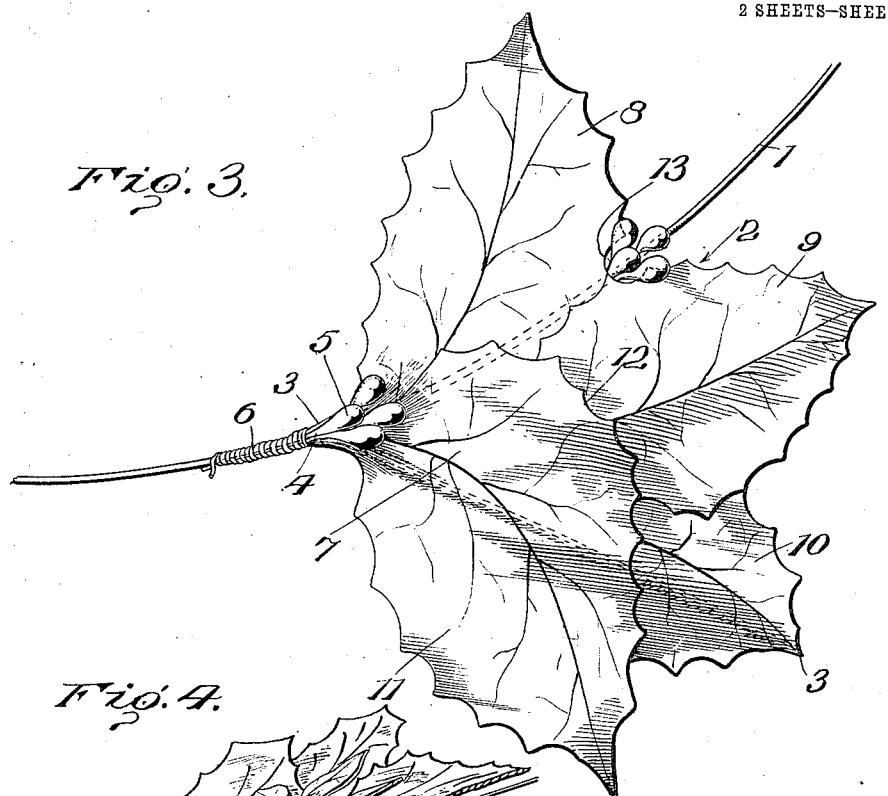

UNITED STATES PATENT OFFICE.

MARTIN L. BEISTLE, OF SHIPPENSBURG, PENNSYLVANIA, ASSIGNOR TO THE BEISTLE COMPANY, INC., OF SHIPPENSBURG, PENNSYLVANIA.

ARTIFICIAL WREATH.

1,093,243.

Specification of Letters Patent.  Patented Apr. 14, 1914.

Application filed May 7, 1913. Serial No. 766,105.

*To all whom it may concern:*

Be it known that I, MARTIN L. BEISTLE, citizen of the United States, residing at Shippensburg, in the county of Cumberland and State of Pennsylvania, have invented certain new and useful Improvements in Artificial Wreaths, of which the following is a specification.

This invention relates to artificial wreaths. Manufacturers of artificial flowers, wreaths, and the like, have endeavored for years to produce an artificial holly wreath which would retain its shape and which would have the desired natural appearance.

It is therefore the primary aim of the present invention to provide an artificial holly wreath so constructed that it will appear to embody a number of separate leaves arranged in clusters with a number of berries in each cluster, the leaves being so constructed as to lock with the berries in such a manner as to insure against relative displacement of the leaves so that the wreath as a whole will retain its shape for an indefinite period of time.

Another feature of the invention resides in so cutting and embossing the leaf cluster blanks that a single blank will appear as a number of separate leaves although it is in reality integral throughout.

For a full understanding of the invention reference is to be had to the following description and accompanying drawing, in which:—

Figure 1:
Figure 2:
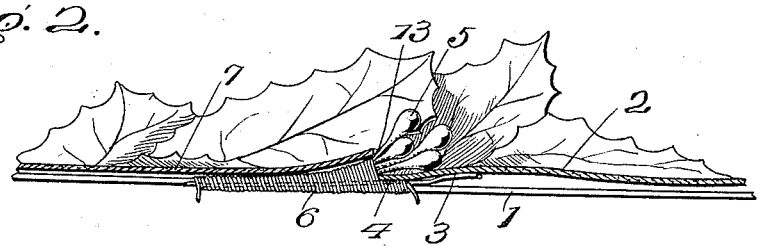

Figure 1 is a view in elevation of a wreath constructed in accordance with the present invention. Fig. 2 is a vertical sectional view through two adjacent clusters, illustrating the manner in which the leaves interlock with the berries. Fig. 3 is a plan view of one of the leaf clusters and the associated berries. Fig. 4 is a vertical fragmentary sectional view illustrating a slight modification of the invention. Fig. 5 is a fragmentary plan view of the modified structure.

Corresponding and like parts are referred to in the following description and indicated in all the views of the accompanying drawings by the same reference characters.

In the drawings the wreath is illustrated as made up of a number of leaf cluster blanks and clusters of artificial berries, both of which are assembled and supported upon an annular wire frame which is indicated by the numeral 1. The leaf cluster blanks are indicated in general by the numeral 2 and may be made of any suitable material and each is provided with a stem-portion 3.

In mounting the leaf cluster blanks upon the frame 1, the stem portion 3 is disposed upon the frame together with the stems 4 of artificial berries which are indicated at 5. A cord, wire, or paper is then wrapped around the stems 3 and 4 and around the wire of the frame, as indicated at 6. By reference to Fig. 3 of the drawings it will be observed that a cluster of berries is located at the base of each leaf cluster blank, and consequently each group of berries appears to be surrounded by a cluster of leaves.

The leaf cluster blanks are made from any suitable sheet material, such for example as paper or cloth to which has been applied a suitable coating to give the blank its proper color and finish and after the blanks have been cut from the sheet of material they are embossed in such a manner that each blank will have the appearance of a cluster of separate and distinct leaves. This result is accomplished by more heavily embossing certain portions of the blank than others, so that the veins in each of the several leaves comprising the cluster will appear more or less distinct than the veins in adjacent leaves. The leaf cluster blank is indicated specifically by the reference numeral 7 and the leaf portions comprising the blank are indicated, one by the numeral 8, another by the numeral 9, a third by the numeral 10 and a fourth by the numeral 11. By reference to Fig. 3 it will be noted that the leaf portions 9 and 11 appear to overlap the portion 10; that the portion 11 appears to overlap the portions 8 and 9 and that the portion 8 apparently overlaps one edge of the portion 9, although all of these portions constitute an integral blank. As stated above, this appearance of the blank is the result of more heavily embossing the veins in certain of the leaf portions than in the others, and further by heavily embossing the blank as at 12, where the edge of one leaf appears to overlap an adjacent leaf portion. Between the portions 8 and 9 the blank is formed with a well defined notch 13 which serves a purpose to be presently explained.

As before stated, the stems of the leaf cluster blanks and the stems of the berries are secured to the wire frame 1 by wrapping as at 6, and the clusters of leaves and berries are so arranged upon the frame that the notch 13 in each leaf cluster blank will receive the artificial berries which are assembled with the stem of the next adjacent leaf cluster blank.

It will be observed by reference to Fig. 3 of the drawings that the notch 13 is of less width than the cluster of berries, the stems of which it receives, so that the berries engaging against the face of the leaf blank at opposite sides of the notch, restrain the blank against displacement with respect to the frame. If it were not for the provision of this simple means for holding the leaf blanks in place, they would soon become sprung away from the frame thereby, not only exposing the same to view but rendering the wreath flimsy and unsightly.

By reference to Fig. 3 it will be seen that the leaf portion 8 is located practically wholly within the bounds of the frame 1 and that the other leaf portions 9, 10 and 11 lie outside of the frame. In order that the portions 9, 10 and 11 may be stiffened to the desired degree and thereby be prevented from bending to one side or the other, the stem 3 of each leaf cluster blank, which stem is formed of wire, is extended beneath the blank across the portion 11 and medially of the leaf portion 10 and terminates at the apex of the last mentioned portion. This stem is preferably secured to the under side of the leaf by a suitable adhesive.

The form of the invention shown in Figs. 4 and 5 is identical with that shown in the first three figures, except that a flower 14 is substituted for the berries 5 and it will be observed that the notch 13 in this form of the invention receives the stem of the flower in the same manner that it receives the stems of the berries in the first described form of the invention.

Having thus described the invention what is claimed as new is:—

1. In an imitation wreath, a frame, elements arranged thereon and comprising the wreath proper, one of said elements having a marginal notch receiving a portion of another element whereby the elements are held against relative displacement.

2. In an artificial wreath, a frame, elements arranged thereon and comprising the wreath proper and having stem portions, one of said elements having a marginal notch receiving the stem portion of another element whereby the elements are held against relative displacement.

3. In an imitation wreath, a frame, leaf and berry or similar elements arranged thereon and comprising the wreath proper, each leaf element having a marginal notch receiving a portion of the berry or similar element whereby the said elements are held against relative displacement.

4. In an imitation wreath, a frame, leaf and berry or similar elements arranged thereon and comprising the wreath proper, each of the berry or similar elements being arranged at the base of one of the leaf elements and each leaf element being provided with a marginal notch receiving the berry element of the next adjacent leaf element.

5. In an imitation wreath, a frame, elements arranged thereon and comprising the wreath proper, the said elements each including a stem portion attached to the frame and one element having a marginal notch receiving the stem of the next adjacent element.

6. In an imitation wreath, a frame, leaf elements arranged thereon and comprising the wreath proper, each leaf element having a stem extending across its under side and secured thereto and at one end secured to the frame.

7. In an imitation wreath, a frame, leaf elements arranged thereon and comprising the wreath proper, each leaf element being formed to represent a cluster of leaf portions, one of the leaf portions lying within the frame and the other leaf portions lying exteriorly of the frame, the leaf element having a stem secured to its under side and extending beneath certain of the last mentioned leaf portions and at one end secured to the frame.

8. An artificial leaf element consisting of a blank embossed to represent a cluster of leaf portions and the said blank within the bounds of the several leaf portions being embossed to represent veins, the veins of one leaf portion being more heavily embossed than the veins of another leaf portion.

In testimony whereof I affix my signature in presence of two witnesses.

MARTIN L. BEISTLE. [L. S.]

Witnesses:
J. S. OMWAKE,
EMILY J. HAMILTON.

Copies of this patent may be obtained for five cents each, by addressing the "Commissioner of Patents, Washington, D. C."